Jan. 17, 1956 W. PALMER 2,731,634
TIMING APPARATUS
Filed Dec. 7, 1945 4 Sheets-Sheet 1

INVENTOR
WINSLOW PALMER
BY Paul B. Hunter
ATTORNEY

Fig. 6.

United States Patent Office 2,731,634
Patented Jan. 17, 1956

2,731,634

TIMING APPARATUS

Winslow Palmer, West Hempstead, N. Y., assignor to Sperry Rand Corporation, a corporation of Delaware Application December 7, 1945, Serial No. 633,473

55 Claims. (Cl. 343—103)

The present invention relates generally to timing systems and, more particularly, to a method and apparatus for producing two periodic pulse waves of adjustable recurrence rate spaced a predetermined time interval and for providing a direct and precise indication of such interval.

Direct-reading timing devices have been developed that are capable of measuring periodic time intervals with extreme precision. One of the most satisfactory types of such devices and one that has found extensive application in radar systems employs a relatively high frequency oscillator of excellent accuracy and stability as a timing standard. The output of the oscillator is connected to a chain of frequency dividers which reduce the original frequency to the repetition rate of the interval that it is desired to measure. A plurality of mechanically coupled linear phase shifters are provided each adapted to alter the phase of a wave derived from a different portion of the frequency dividing chain. These phase shifters are geared together in the ratios of the frequencies of their respective impressed waves. This ratio is chosen in order that all the phase-shifted waves will be subjected to the same time delay for a given rotation of a delay control knob although the angular phase shift of the highest frequency wave is many times that of the lowest frequency wave. The wave having the repetition rate of the interval to be measured is employed to select the most nearly coincident wave from the next higher frequency waves. This selected wave may be utilized in turn to select from the phase-shifted waves of a still higher frequency the wave closest in time thereto.

Thus, a single pulse wave is obtained which is delayed by any desired interval within the period of the lowest frequency wave and which at the same time has the timing precision inherent in the highest frequency phase shifter. The lower frequency phase shifters merely keep track of the number of revolutions through which the highest frequency phase shifter has been rotated and serve only to extend its range of measurement. Reasonable errors in the lower frequency phase shifts, therefore, do not in any way affect the overall accuracy of the timing device.

A reference pulse wave is obtained by employing a wave derived directly from the output of the frequency dividing chain to select a wave derived from the same source as the wave supplied to the highest frequency phase shifter. Thus variation in the time delay occurring in the frequency dividing chain does not disturb the precision of the interval measured between the reference pulse wave and the finally selected delayed pulse wave. This interval is conveniently revealed by an indicator such as a revolution counter mechanically coupled to the highest frequency phase shifter.

Not all systems requiring precise measurement of periodic time intervals operate with fixed recurrence rates as is usual in radar apparatus. The Loran system of radio navigation, the principles of which are described in the November 1945 issue of Electronics on pages 94–99, is an example of a system necessitating precise determinations of periodic time intervals whose recurrence rates are different. This system is adapted to measure the relative time of arrival of two radio signals sent synchronously from known points. This measured time difference is utilized to determine directly from special tables or charts a line of position on the earth's surface. Two lines of position determined from two pairs of signals fix the location of the receiver at the intersection of these lines. Since the accuracy of the positional fix is dependent upon the exactness with which the time difference is measured, it is essential to employ a measuring system which can fully utilize the precision with which the signals are synchronized.

These signals are pulse waves which occupy a considerable portion of the frequency band available for this radio navigation service with the result that only a few radio frequency channels may be provided within the prescribed frequency limits. In order to distinguish between pairs of signals, a number of such signal pairs are operated on the same radio frequency channel at different signal frequencies or pulse wave repetition rates.

Prior to the present invention, apparatus of the character described above was not readily adapted to be used where it was necessary to alter the repetition rate of the measured interval. If the rate is changed by altering the frequency of the high frequency oscillator, the frequency of the waves applied to the phase shifters is necessarily altered. A constant phase shift no longer corresponds to a constant time delay. Thus the units of time indicated by a revolution counter vary according to variation in the timing standard.

To determine the true interval either the indicated reading must be multiplied by a factor varying with the repetition rate of the pulse waves, in which event the apparatus is no longer direct-reading, or the gearing ratio between the phase shifters and the revolution counter or other indicator must be altered. These expedients have been found to be unsatisfactory either because of the additional time required, in the former case, by the added mental step and danger of operation error inherent therein or, in the latter case, because of loss of accuracy and mechanical complications.

It is therefore the principal object of the invention to provide a novel method and simplified and improved apparatus for measuring the time interval between two signals of adjustable frequency.

A further object of the invention is to provide apparatus for producing two periodic signals separated by a predetermined time interval, the periodicity of which signals may be altered without affecting the time interval therebetween.

A further object of the invention is to provide improved apparatus and instrumentalities embodying novel features and principles adapted for use in realizing the above objects and also applicable in other fields.

The invention in another of its aspects relates to novel features of the instrumentalities described herein for achieving the objects of the invention and to novel principles employed in those instrumentalities irrespective of whether these features and principles are used in achieving the objects or in the same field.

Generally speaking, the invention contemplates producing two periodic pulse waves, a reference pulse wave and a delayed pulse wave. The time spacing or interval between the two pulse waves is measured in terms of the sum of the whole periods or recurrence intervals of a series of measuring waves plus any fraction of such period or recurrence interval that fills the time between some portion of the reference pulse wave, e. g., its termination, and a similar portion of the delayed pulse wave. The measuring waves are produced at a substantially constant fundamental frequency and may be either approximately sinusoidal or pulse-shaped. The periodicity or recurrence rate of the reference and delayed pulse waves is determined by the fundamental frequency of a second series of waves related by an adjustable rational ratio to the frequency of the measuring waves. The ratio between the first and second series of waves is not necessarily a simple ratio, for example, 5, 4 or 3 to 1, but may have a value such as 399 or 298 to 100.

The reference pulse wave is generated by a selector circuit in response to a particular wave of the first or measuring series subsequent to a predetermined portion of each wave of the second series.

Apparatus is provided responsive to the fundamental component of each wave of the first or measuring series for shifting the phase thereof. This apparatus may take the simple form of a linear phase shifter when the waves are initially substantially sinusoidal. If waves of the first series contain any harmonic components, as is the case when the waves are pulse-shaped, the addition of a filter is necessary to abstract the fundamental component of each wave. A selector circuit, which may be similar to the reference pulse wave selector circuit, is then employed to select the phase-shifted fundamental component of a particular measuring wave subsequent to the predetermined portion of each wave of the second series to which the reference pulse wave selector circuit was responsive. The pulse wave thus selected serves as the above-mentioned delayed pulse wave.

The time interval between the reference and delayed pulse waves is equal to the length of the substantially constant period or recurrence interval of the measuring waves multiplied by the sum of the recurrences of these waves in the time between the operation of the first and second selector circuits plus the fractional period delay introduced by the phase shifter. The rate at which the reference and delayed pulse waves recur is, however, under the control of the second series of waves. Each wave of the second series restarts the timing sequence. The frequency of the second series of waves may be varied over wide limits provided it always remains substantially lower than the frequency of the first or measuring series of waves and is related thereto by a rational ratio. In this manner, the delayed pulse wave is retarded relative to the reference pulse wave by an interval substantially unchanged by change in the adjustable ratio between the frequencies of the first and second series of waves.

In one form of the invention the generation of the second series of waves introduces a momentary discontinuity in the first or measuring series of waves. Such discontinuity produces a periodic distortion in the fundamental component of the measuring waves. This results in a transient error in the delay introduced by the phase shifter. For this reason the reference pulse wave is not selected until after the effects of this distortion have died away. Under these conditions the measured interval lies entirely outside the interval during which errors caused by discontinuity of the first or measuring series of waves may occur. The measured interval may be further removed from this source of error by providing a delay after each wave of the second series is generated before selecting either the reference or the delayed pulse wave.

The invention will be more fully understood by reference to the embodiments illustrated in the drawings and to the following description thereof.

Figure 1:
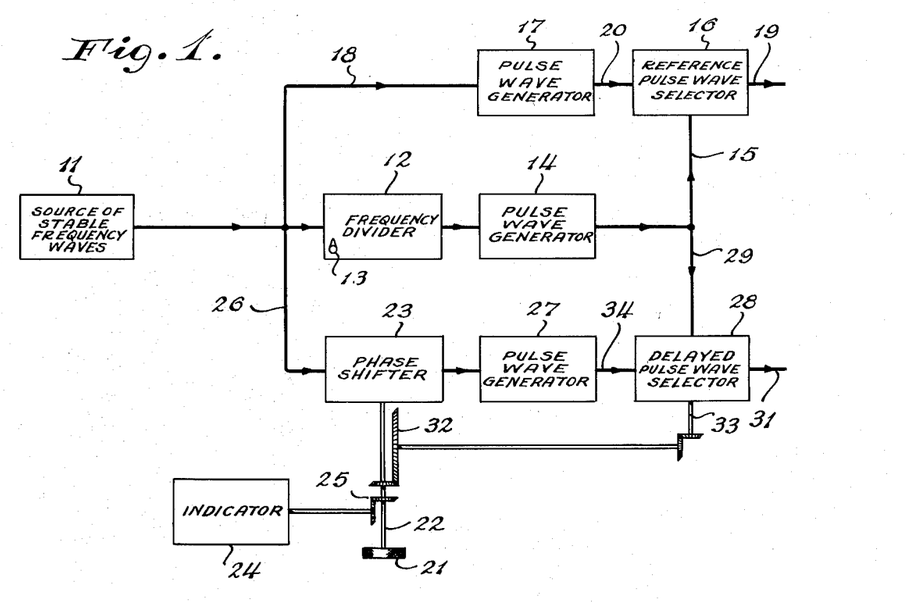
Fig. 1 is a block diagram of one form of the timing apparatus of the present invention.

Referring now to Fig. 1, one form of the invention is illustrated wherein a source 11 of stable frequency provides sinusoidal waves which are utilized in the manner now to be described as the timing basis for measuring intervals between pulse waves having adjustable recurrence rates.

Waves from the source 11 are supplied to a frequency divider 12 which is adapted to reduce the frequency of the applied waves by a factor which may be selected at will by a frequency dividing ratio control 13. Frequency divider 12, therefore, produces waves which have a fundamental frequency or repetition rate that is related to the frequency of the wave from the source 11 by an adjustable rational ratio. A pulse wave generator 14 is coupled to the frequency divider 12 for the purpose of generating pulse waves in response to each output wave from device 12.

The pulse wave generator 14 may comprise a distorting amplifier adapted to clip the tops and bottoms of the waves supplied by frequency divider 12 forming square waves therefrom which may then be differentiated to produce pulse waves. Alternatively, generator 14 may be such other means as a well-known saturable transformer pulse-wave-forming circuit.

The output of pulse wave generator 14 is connected by a lead 15 to a reference pulse wave selector 16, one form of which is described in detail with reference to Fig. 2. Selector 16 comprises a trigger circuit such as a multivibrator which is adapted to be altered from its normal quiescent condition or be "turned on" by the pulse wave generator 14. The selector 16 is returned to its initial quiescent condition or "turned off" by a subsequent cycle of the waves issuing from source 11. This is accomplished by provision of a pulse wave generator 17 to whose input circuit source 11 is connected by lead 18, while its output circuit is coupled by lead 20 to the reference pulse wave selector 16.

Thus, selector 16 produces a substantially rectangular wave appearing on an output lead 19 whose commencement and conclusion are determined by pulse wave generators 14 and 17, respectively. The recurrence rate or frequency of this rectangular wave corresponds to the frequency of the wave supplied by frequency divider 12 which may be varied, as has been stated, by control 13. The termination of the wave created by the reference pulse wave selector 16, is defined by a particular wave from source 11. Accordingly, the rectangular wave is adapted to serve as a timing reference pulse wave whose accuracy is substantially that associated with source 11 and yet whose repetition rate or frequency is lower than the waves from source 11 by the factor determined by ratio control knob 13.

A substantially rectangular wave whose trailing edge is delayed a precise interval with respect to the termination of the reference pulse wave is obtained in a manner now to be described. A delay control knob 21 is attached to a shaft 22 coupled to a linear phase shifter 23. An indicator 24, which may take the form of a revolution counter, is coupled to shaft 22 by gearing 25. Phase shifter 23 is supplied with substantially sinusoidal waves over a lead 26 from the source 11.

The phase of the waves applied to phase shifter 23 is adapted to be shifted substantially uniformly as the control knob 21 is rotated. The phase-shifted waves are formed into pulse waves by pulse wave generator 27 which may be similar to generators 14 and 17. The phase-shifted pulse waves are applied to a delayed pulse wave selector 28, one form of which is described in detail with reference to Fig. 3 and is a multivibrator circuit of the same general type as is employed in selector 16.

The selector 28 is adapted to be "turned on" by the pulse wave from generator 14 applied over a lead 29 and "turned off" by a subsequent delayed pulse wave supplied from pulse wave generator 27. By this action, a substantially rectangular wave is generated in selector 28 and appears on an output lead 31. The end of this rectangular wave is delayed an amount relative to the end of the rectangular wave created by the reference pulse wave selector 16 that is primarily dependent upon the frequency of the waves from source 11, the phase shift caused by phase shifter 23, and the ordinal number of the delayed pulse wave selected following the pulse wave from generator 14. The particular delayed pulse wave which terminates the wave appearing on lead 31 is determined in accordance with the position of delayed control knob 21 by means of reduction gearing 32 driven by shaft 22, and a further shaft 33 which is introduced into the selector 28 to alter the sensitivity of the selector to the pulses applied thereto subsequent to the triggering of the circuit by the low frequency pulse wave from the pulse wave generator 14.

The action of the mechanical coupling between control knob 21 and the selector 28 is to alter the sensitivity of the selector to the pulse waves from generator 27, as these pulse waves are delayed in time. Selector 28 is triggered off by pulse waves that occupy a progressively retarded time position relative to the pulse waves applied over lead 29 which triggers the device on. Accordingly, by the time the phase shifter 23 has completed one revolution, the selector 28 is in a condition to select a pulse wave only after an additional time delay equal to the recurrence interval between pulse waves. The combined action of the phase shifter 23 and the selector 28 is to retard the delayed pulse wave smoothly and without any discontinuity over a range of interval measurements many times greater than the period or recurrence interval of the waves from source 11. It is to be noted that the gear ratio between phase shifter 23 and selector 28 may be fixed at any convenient value and may be left undisturbed by changes in the frequency ratio of the waves supplied from pulse wave generators 14 and 27. The mechanical coupling between phase shifter 23 and selector 28 is not functionally related to the frequency of the reference and delayed pulse waves, but is employed merely to maintain synchronism between the reading of the indicator 24 and the ordinal number of the pulse wave from generator 27 which triggers off selector 28 after the selector has been "turned on" by a pulse wave from generator 14.

Thus it is seen that the apparatus of Fig. 1 produces reference and delayed pulse waves whose respective terminations are determined by different cycles of the waves issuing from source 11. The action of the pulse wave generator 14 on the other hand is to determine the respective commencements of the reference and delayed pulse waves thus prescribing the recurrence rate of the waves and in effect periodically restarting the timing sequence.

Figure 2:
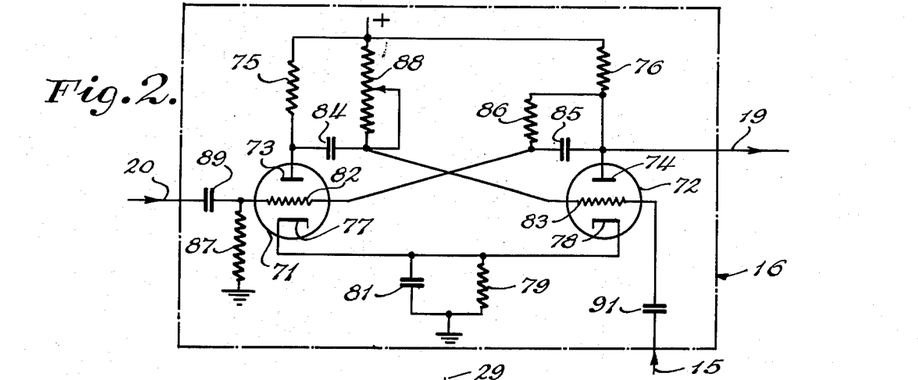
Fig. 2 is a wiring schematic diagram of a multivibrator circuit which may be employed as a reference pulse wave selector circuit in the apparatus shown in Fig. 1.

One practical form that the reference pulse wave selector 16 may assume is shown in detail in Fig. 2. Selector 16 comprises electron discharge tubes 71 and 72 regeneratively connected to form a multivibrator. Anodes 73 and 74, of tubes 71 and 72, respectively, are connected through load resistors 75 and 76 to a source of positive potential. Cathodes 77 and 78 of tubes 71 and 72, respectively, have a common cathode circuit consisting of a resistor 79 and a capacitor 81 connected in parallel between the cathodes and ground. Control grids 82 and 83 of tubes 71 and 72, respectively, are coupled by capacitors 85 and 84 to the anodes of the opposite tubes. Grid 82 has also direct current connections to anode 74 through a resistor 86 placed in parallel with capacitor 85 and to ground through a resistor 87. Grid 83, on the other hand, is connected through an adjustable resistor 88 to a positive source of potential. Lead 20, from the pulse wave generator 17, is connected by way of a blocking capacitor 89 to the grid 82 while lead 15, from the pulse wave generator 14, is connected through blocking capacitor 91 to grid 83. Output lead 19 is attached to the anode 74.

In the operation of the reference pulse wave selector 16, tube 72 is normally conductive because of the positive potential applied to its grid 83 through resistor 88. Tube 71, on the other hand, is normally maintained in a nonconductive state as a result of the voltage drop due to the flow of current in tube 72 and through the common cathode resistor 79. However, when a negative pulse wave is applied over lead 15 to grid 83, the anode current in tube 72 decreases, and the potential at anode 74 rises because of the reduced voltage drop across anode load resistor 76. This rise in anode voltage is applied to grid 82 of tube 71 through the parallel combination of capacitor 85 and resistor 86. The grid to cathode voltage is increased to the point at which tube 71 begins to conduct. The incipient flow of current through this tube causes the potential on anode 73 to drop, and this voltage change is impressed on grid 83 of tube 72 through capacitor 84, reducing the current flow through the latter tube still further. This action causes an additional increase in the potential on anode 74. The entire regenerative sequence occurs almost instantaneously and continuously until tube 72 is completely nonconductive and tube 71 is strongly conducting.

If no pulse waves were applied over lead 20, the circuit would remain in this operating condition until capacitor 84 regained a charge by current flowing through resistor 88 from the positive potential source sufficiently positive to cause tube 72 to commence conducting. At this point the operating conditions of tubes 71 and 72 would reverse. However, pulse waves are continually supplied over lead 20, are amplified and inverted in polarity by tube 71 and are applied to grid 83 through the capacitor 84. As capacitor 84 charges, a potential is reached by the peak of one of the positive pulse waves which triggers or initiates conduction in tube 72. When tube 72 begins to conduct, its anode voltage falls and this change is applied to grid 82 of tube 71 which amplifies and inverts the polarity of the change and applies it to grid 83 causing tube 72 to conduct still more. This regenerative action results in "turning on" tube 72 and "turning off" tube 73.

It is evident that a substantially rectangular wave appears on the output lead 19 initiated by each pulse wave applied over lead 15 at a relatively low frequency which may be varied and the wave is terminated by one of the pulse waves applied over lead 20 at a higher frequency as discussed with reference to Fig. 1. The ordinal number of the pulse wave, which defines the termination of the rectangular wave impressed on output lead 19, is determined by the adjustment of the resistor 88.

Figure 3:
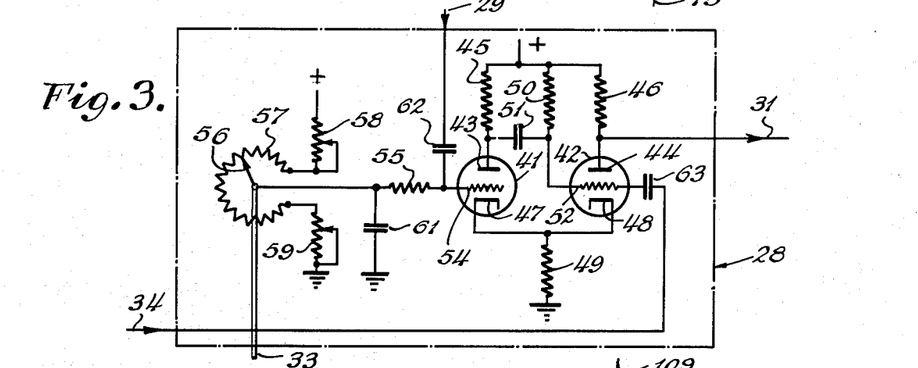
Fig. 3 is a wiring schematic diagram of a multivibrator circuit which may be employed as a delayed pulse wave selector circuit in the apparatus shown in Fig. 1.

The delayed pulse wave selector 28, shown in greater detail in Fig. 3, comprises electron discharge tubes 41 and 42 so arranged as to form a delay multivibrator. Anodes 43 and 44 of tubes 41 and 42, respectively, are connected through load resistors 45 and 46, respectively, to a source of positive potential. Cathodes 47 and 48 of tubes 41 and 42, respectively, have a cathode resistor 49 in common. The control grid 52 of tube 42 is coupled by a capacitor 51 to anode 43 and by a resistor 50 to a source of positive potential. The control grid 54 of tube 41 is connected through a grid resistor 55 to a sliding contact arm 56 of a voltage divider 57. The ends of voltage divider 57 are attached to adjustable resistors 58 and 59. The series combination of resistors 58, 57 and 59 is connected between a source of positive potential and ground. The sliding contact arm 56 is shunted by a capacitor 61 and is mechanically coupled to the shaft 33. Leads 29 and 34 from pulse wave generators 27 and 14, respectively, are connected through blocking capacitors 62 and 63 to grids 54 and 52 of tubes 41 and 42, respectively.

In the operation of the delayed pulse wave selector 28 illustrated in Fig. 3, tube 42 normally conducts heavily since its grid resistor 50 is connected to a positive potential. The anode current of tube 42 flows through the common cathode resistor 49 and biases tube 41 beyond cutoff. Under these conditions, the anode potential of tube 41 is equal to the supply voltage. The circuit remains in this condition until the arrival of a trigger pulse wave of the proper polarity and magnitude.

Whenever a positive pulse wave is supplied over lead 29 from the pulse wave generator 14, grid 54 is driven sufficiently positive to cause tube 41 to conduct. The voltage at anode 43 drops, and this change in potential is impressed on the grid 52 of tube 42 through coupling capacitor 51, causing the anode current of the tube to decrease. The decrease in anode current decreases the cathode bias of tube 41 causing it to conduct still more. This regenerative action results in cutting off current flow through tube 42 and maximizing the flow through tube 41.

The anode current of tube 41 when it conducts is less than the corresponding current of tube 42 when the latter conducts. Therefore, the increasing anode current through tube 41 does not prevent the transition process. The voltage at the grid 52, which was driven negative by the abrupt drop of the potential on anode 43, cannot regain its positive potential until the grid side of capacitor 51 is charged by the supply potential through grid resistor 50.

As capacitor 51 charges, however, positive delayed pulse waves are being supplied at the operating frequency of the source 11 over lead 34 to the grid 52 of tube 42. Eventually, as capacitor 51 continues to be charged through resistor 50, the positive peak of one of the pulse waves will cause tube 42 to conduct, and when this happens the selector circuit returns abruptly to its original quiescent condition with tube 41 not conducting and tube 42 conducting. Since the anode current through either tube rises and falls abruptly to a stable value, the output wave on lead 31 connected to anode 44 is a substantially flat topped wave. The length of the output wave is variable and exactly controlled by the combination of phase shifter 23 and voltage divider 57, the position of the moving contact arm 56 of the latter being coordinated with the shaft 22 of the former.

The purpose of the variable voltage divider 57 is to extend the unambiguous range of time interval that may be measured by the timing apparatus of Fig. 1. The bias of grid 54 may be controlled by varying the position of the contact arm 56 on voltage divider 57. In the absence of any pulse waves from pulse wave generator 27, the bias determines the approximate length of the rectangular output wave appearing on lead 31. That this is true is evident from the following considerations.

After the multivibrator has been triggered on, tube 41 is conducting and tube 42 is cut off. The amount of current flowing through tube 41, and, consequently, the drop of its anode potential due to the current flow through resistor 45 may be controlled by the grid bias voltage supplied by the voltage divider 57. The extent to which capacitor 51 is driven negative, and therefore the amount of charge it would have to receive in the absence of any triggering pulse waves to cause tube 42 to conduct, depends on the potential on anode 43. If the bias on grid 54 is more positive, the anode potential of tube 41 will be lower during periods of conduction. Capacitor 51 will be driven more negative and, therefore, will require more time to recharge, resulting in a longer natural length of the rectangular output wave. If, on the other hand, the bias is more negative, capacitor 51 will require less time to charge and the natural length of the output wave will be shorter. Thus the position of the contact arm 57 tends to control the length of the output wave.

Shaft 33, to which the contact arm 57 is fastened, is so aligned and geared down with respect to shaft 22 and phase shifter 23 that the natural length of the rectangular output wave produced by selector 28 tends to be slightly longer than the length actually desired. One of the phase-shifted pulse waves from pulse wave generator 27 prematurely triggers off tube 42 and precisely defines the rear edge of the output wave. The rear edge is locked to the phase-shifted pulse waves by insuring that the natural length of the output wave under the control of voltage divider 57 is always at least equal to the time delay between the pulse wave from generator 14 and the next succeeding pulse wave from generator 27, and the amplitudes of the latter pulse waves are sufficiently large so that the total instantaneous voltage applied to grid 52 of tube 42 at the top of each pulse wave is larger than the voltage at the base of the next pulse wave. The grid bias is thus varied in unison with the retardation of the pulse waves from generator 27 so that the pulse wave which triggers tube 42, thus defining the termination of the rectangular output wave, maintains a substantially constant position with respect to the cutoff bias of tube 42 irrespective of the setting of the delay control knob 21.

Figure 4:
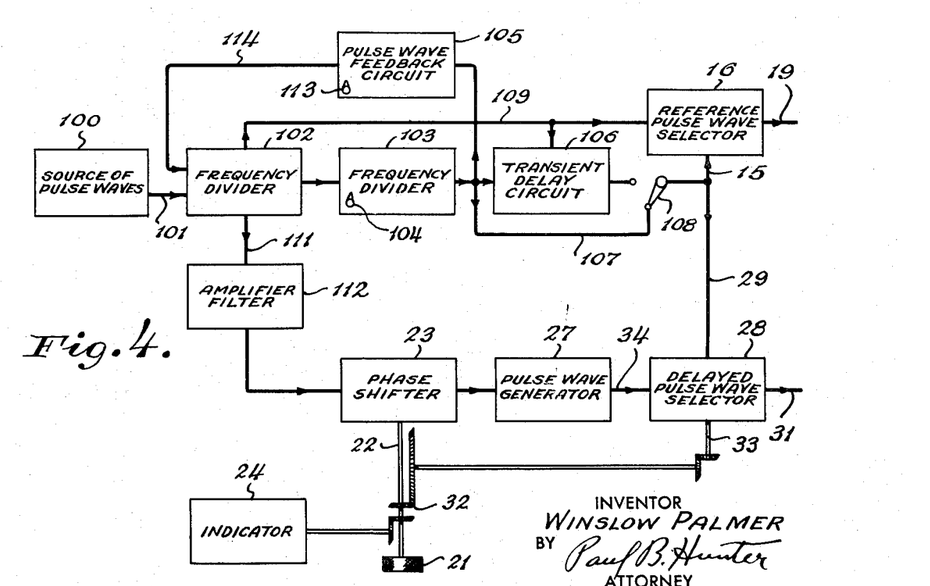
Fig. 4 is a block diagram of another form of the timing apparatus of the present invention.

An outstanding characteristic of the embodiment of the invention shown in Fig. 4 is the ease and certainty with which the intervals between pulse waves recurring at only slightly different rates may be measured.

Pulse waves of stable frequency are supplied from a source 100 over a lead 101 to a frequency divider 102 which may conveniently take the form of a pulse wave counter adapted to generate a single pulse wave in response to a plurality of applied pulse waves. Such counters comprise a charge collecting capacitor operatively connected to a discharging device such as a gaseous discharge tube or a blocking oscillator. The capacitor is charged in discrete voltage increments by each applied pulse wave. The potential on the charge collecting capacitor increases in steps until it exceeds a critical potential corresponding to a predetermined number of applied pulse waves. When the potential reaches this critical value the discharge device coupled to the capacitor is triggered, discharging the capacitor and at the same time supplying a pulse wave to the output circuit of the counter.

Frequency divider 102 is connected to a frequency divider 103 which may be of the same general type as divider 102 but which is provided with a dividing ratio control 104 by which the number of input pulse waves necessary to produce an output pulse wave is adjusted. Pulse waves from the second divider 103 are applied to a pulse wave feedback circuit 105, a transient delay circuit 106, and a lead 107. The lead 107 connects to the lower position of a single-pole double-throw switch 108 whose other or upper position is connected to the output circuit of transient delay circuit 106.

Switch 108 connects with leads 15 and 29 which, as in Fig. 1, are attached to reference pulse wave selector 16 and delayed pulse wave selector 28, respectively. When placed in the lower position, switch 108 applies pulse waves from divider 103 directly to selectors 16 and 28. Lead 109 interconnects selector 16 with the first frequency divider 102 in order that the termination of the rectangular wave produced by this selector be determined by a particular wave from divider 102. This rectangular wave appearing on lead 19 is thus adapted to serve as the reference pulse wave.

The pulse wave generator 17, employed in Fig. 1, is not required in the embodiment of the invention under discussion because the waves derived from the divider 102 are already pulse shaped. As a consequence of the pulse shape, however, it is necessary to interpose a filter 112 between frequency divider 102 and phase shifter 23 in order to extract the fundamental component of each wave issuing from the divider. Once this fundamental component is obtained, phase shifter 23, pulse wave generator 27 and delayed pulse wave selector 28 operate in a manner similar to that discussed with reference to Fig. 1 to provide on lead 31 the delayed pulse wave whose time spacing with respect to the reference pulse wave is indicated by indicator 24.

The apparatus of Fig. 4, so far discussed, permits only a limited number of reference and delayed pulse wave recurrence rates to be obtained by manipulation of dividing ratio control 104. The difference between one pulse wave frequency and the next is necessarily a substantial fraction of the frequency itself. For example, ratio control 104 may be so adjusted that an output pulse wave is generated by frequency divider 103 for every 10th, 9th or 8th input pulse wave.

The interval recurrence rate of the reference and delayed pulse waves may be varied from the basic rate of the pulse waves issuing from divider 103 by specific small amounts through the employment of pulse wave feedback circuit 105. Feedback circuit 105 applies a modified version of the pulse wave coming from the divider 103 to the input of frequency divider 102. The feedback pulse waves supplied over a lead 114 are added to the pulse waves from source 100 and cause the charge collecting capacitor associated with frequency divider 102 to rise more quickly to the critical potential at which the discharging device operates. The only interval between pulse waves supplied by divider 102 that is shortened is the one during which the feedback pulse wave is applied. The amount by which the total recurrence interval between one reference pulse wave and the next is shortened depends upon the magnitude of the feedback pulse wave applied to frequency divider 102. This is adjusted by amplitude control knob 113 which may merely switch appropriate capacitors in series with lead 114 to attenuate the pulse wave from divider 103 the proper amount to correspond to the desired number of pulse waves from source 100 by which the total recurrence interval is to be reduced.

The frequency of the reference and delayed pulse waves may in this manner be altered according to the setting of the amplitude control 113 without affecting the interval between the majority of the pulse waves generated by frequency divider 102. The fundamental frequency of the pulse waves from divider 102 is constant with the exception of a momentary distortion immediately following the feedback pulse which shortens one of the intervals between the pulse waves.

It is in the perception and utilization of the substantially constant frequency characteristic of the waves issuing from divider 102 that an important aspect of the present invention resides.

The momentary distortion in the fundamental frequency of the pulse waves from frequency divider 102 produces a transient error in the phase shift of the fundamental component waves issuing from phase shifter 23. For this reason the reference pulse wave is not selected until after the effects of this distortion have died away. This insures that the interval between reference and delayed pulse waves lies in the constant frequency region between the periodically distorted regions of the waves extracted from divider 102.

The measured interval may be further removed from this source of error by throwing switch 108 to its upper position and inserting the transient delay circuit 106. Circuit 106 produces a pulse wave which is initiated by the output pulse waves from divider 103 and which is terminated by a particular pulse wave from divider 102. The reference and delayed pulse wave selectors 16 and 28 are turned on by the termination of the wave generated by transient delay circuit 106. By this means the commencement of the reference and delay pulse waves may be retarded until the above-mentioned distortion has disappeared.

The operation of the apparatus of Fig. 4 is best explained with reference to wave shapes illustrated in Fig. 6. For explanatory purposes only the dividing factors of frequency dividers 102 and 103 are assumed to be 4 and 10 respectively.

Figure 6:
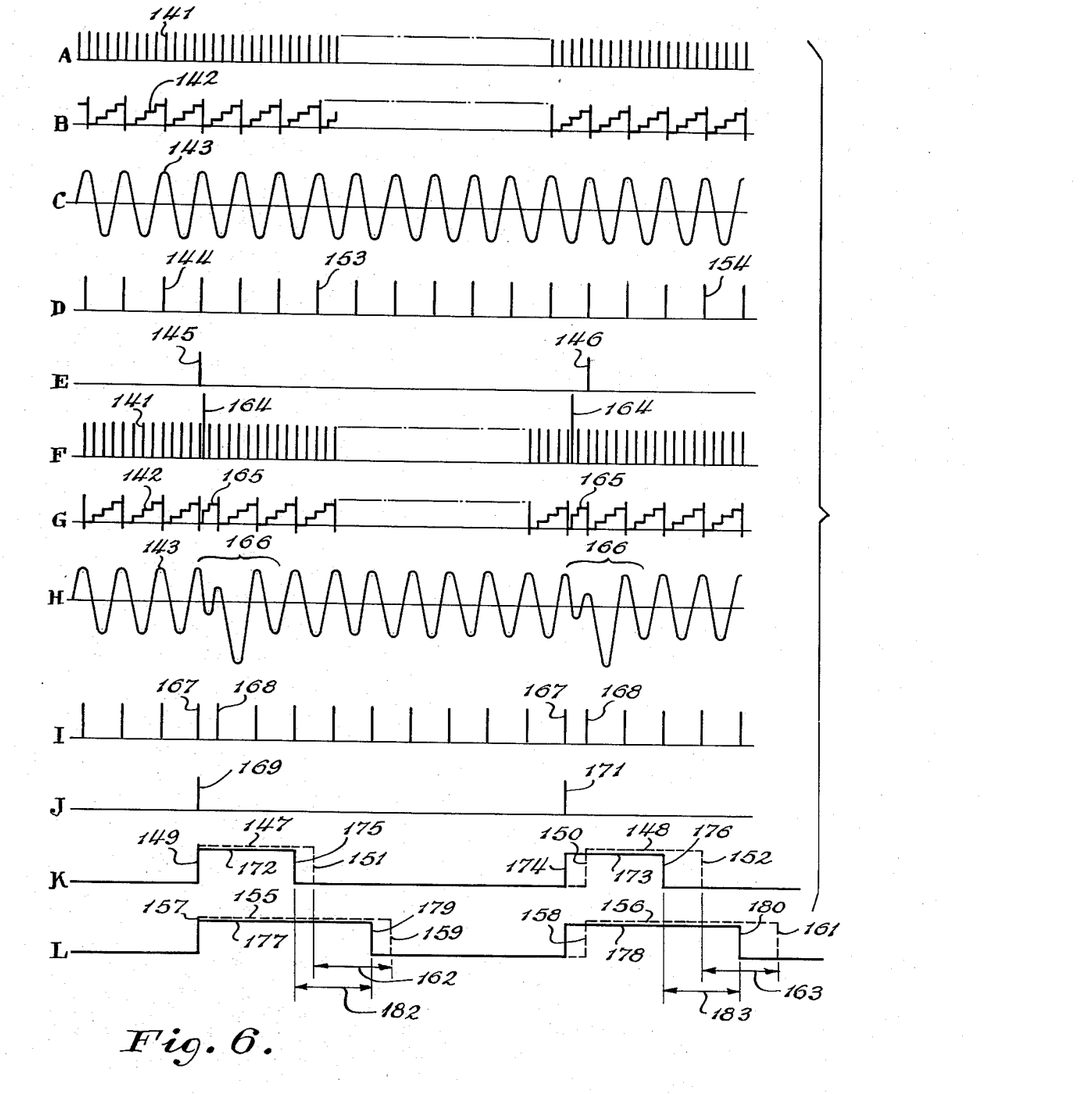
Fig. 6 is a series of graphs illustrating idealized shapes of waves associated with the operation of the apparatus shown in Fig. 4.

Fig. 6A illustrates pulse waves 141 fed to frequency divider 102 from source 100 when the amplitude control 113 of feedback circuit 105 is set to zero and no feedback pulse waves are applied to divider 102. Fig. 6B illustrates the step-shaped potential waves 142 developed across the charge collecting capacitor in divider 102 and impressed on the associated discharging device. Each cycle of waves 142 has four steps corresponding to four of the pulse waves 141. Fig. 6C illustrates fundamental frequency waves 143 which are extracted by filter 112 from the step-shaped waves 142. Fig. 6D shows pulse waves 144 produced by frequency divider 102 in response to the triggering of its discharge device. There is one wave 144 for every four of the waves 141. Fig. 6E indicates at 145 and again at 146 pulse waves generated by frequency divider 103 in response to every ten pulse waves 144 or every forty pulse waves 141. The total recurrence interval between one reference pulse wave and the next is determined by the interval between pulse waves 145 and 146.

Fig. 6K illustrates by dashed lines at 147 and 148 reference pulse waves whose respective commencements 149 and 150 are synchronized in time with output pulse waves 145 and 146 from the frequency divider 103. The selector circuit 16 is adjusted to be "turned off" by the third pulse waves issuing from frequency divider 102 subsequent to output pulse waves 145 and 146, respectively. The terminations 151 and 152 of reference pulse waves 147 and 148 are therefore synchronized in time with particular waves 153 and 154, respectively, of pulse waves 144 shown in Fig. 6D.

Delayed pulse waves are shown in Fig. 6L by dashed lines 155 and 156. The commencement of these waves indicated at 157 and 158 are timed with output pulse waves 145 and 146, respectively, from frequency divider 103. The terminations 159 and 161 of waves 155 and 156 are determined by the waves 143 shown in Fig. 6C after undergoing phase shift in phase shifter 23. Under the particular conditions illustrated, phase shifter 23 introduces zero phase shift and selector circuit 28 is controlled in response to the angular rotation of shaft 33 to select, from the waves shown in Fig. 6C, the fifth waves subsequent to output pulse waves 145 and 146, respectively. Under these conditions delayed pulse waves 155 and 156 are retarded with respect to reference pulse waves 147 and 148, respectively, by intervals indicated at 162 and 163 equal in this instance to two recurrence intervals of the pulse waves 144 shown in Fig. 6D.

Assume for explanatory purposes that a feedback pulse wave 164 is applied over lead 114 with twice the amplitude of the pulse waves 141 issuing from source 100. Feedback pulse wave 164 lags slightly behind every fortieth pulse wave from source 100 and the sum of the waves applied to frequency divider 102 appears as shown in Fig. 6F. The feedback pulse wave 164 substitutes for two pulse waves 141 with the result that only two more pulse waves are required from source 100 to develop sufficient charge across the capacitor in divider 102 to trigger the associated discharging device.

The step-shaped potential wave 142 now includes an abnormal wave 165 with only two steps in response to each feedback pulse wave 164 as is shown in Fig. 6G. All the next nine step-shaped waves have the normal form but are shifted to the left by one-half the period of the wave. This means that each step wave occurs earlier than when there is no feedback pulse wave applied.

Fig. 6H illustrates the fundamental frequency waves 143 which are extracted by filter 112 from the step-shaped waves 142 shown in Fig. 6G. The waves 143 are still substantially sinusoidal except in the region 166 where the shortened step wave 165 is produced and immediately subsequent thereto. The extent of the distorted region 166 is dependent upon the characteristics of filter 112 but may be restricted to a few cycles of the waves 143.

Fig. 6I shows the pulse waves 144 produced by frequency divider 102 in response to the waves 141 and 164 of Fig. 6F. The interval between the pulse wave 167 which immediately precedes the feedback pulse 164, and the next pulse wave 168, are spaced one-half the usual interval, but the next nine pulse waves are timed by normal step-shaped waves 142 and therefore have the normal recurrence interval, that is to say, equal to four intervals of the pulse waves 141.

Fig. 6J indicates at 169 and again at 171 the pulse waves generated by frequency divider 103 in response to every 10 pulse waves 144 shown in Fig. 6I. The total recurrence interval is now equal to the sum of the intervals between 38 pulse waves 141 instead of the original 40 and the recurrence rate of the reference and delayed pulse waves has been increased by slightly more than 5% in this example.

For convenience, pulse wave 169 of Fig. 6J has been drawn in time coincidence with pulse 145 of Fig. 6E. Solid line wave shapes indicated at 172 and 173 in Fig. 6K show the reference pulse waves generated under the pulse wave feedback conditions illustrated in Figs. 6F through 6J. The commencements 149 and 174 of reference pulse waves 172 and 173, respectively, are synchronized with output pulse waves 169 and 171. The terminations 175 and 176 of the reference pulse waves 172 and 173 are synchronized, as under conditions of no feedback pulse waves, with the third pulse waves issuing from frequency divider 102 subsequent to output pulse waves 169 and 171, respectively. The ordinal number of the pulse waves which terminate the reference pulse waves is so chosen that the end of the reference pulse waves always lies outside the region 166 of distortion shown in Fig. 6H.

Delayed pulse waves of the same recurrence rate as reference pulse waves 172 and 173, are shown in Fig. 6L by solid wave forms 177 and 178. The terminations 179 and 180 of waves 177 and 178 are determined by the waves 143 shown in Fig. 6H after undergoing phase shift in phase shifter 23. Without changing the delay control knob from its previous setting when no feedback pulse waves were employed, phase shifter 23 introduces zero phase shift and selector circuit 28 is controlled in response to the angular rotation of shaft 33 to select from the waves shown in Fig. 6H the fifth waves subsequent to output pulse waves 169 and 171, respectively. Delayed pulse waves 177 and 178 are thus retarded with respect to reference pulse waves 172 and 173 by intervals indicated at 182 and 183 equal in this instance to two recurrence intervals of the pulse waves 144 shown in Fig. 6I.

It is to be particularly noted that intervals 182 and 183 are exactly equal to intervals 162 and 163. The effect of the feedback pulse wave 164 has been to alter the recurrence rate of the reference and delayed pulse waves without affecting the time spacing therebetween.

Figure 5:
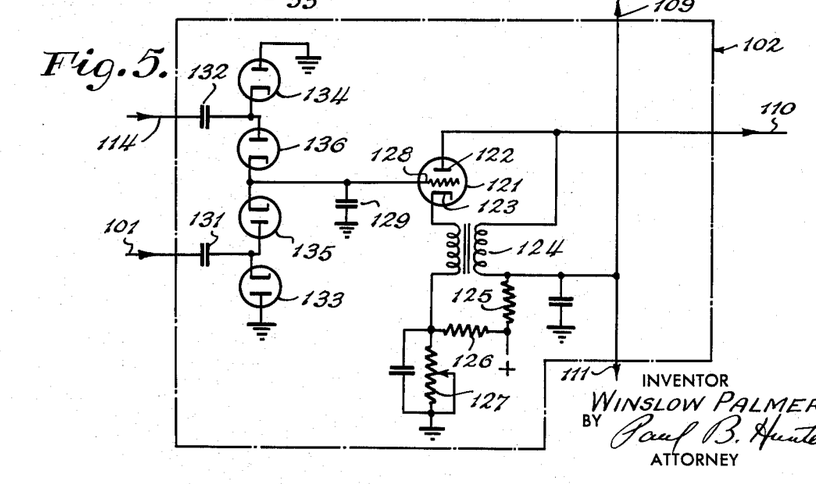
Fig. 5 is a wiring schematic of a pulse wave counting circuit adapted to be used as a frequency divider in the apparatus shown in Fig. 4.

Fig. 5 illustrates a type of pulse counting device which may serve as the frequency divider 102. An electron discharge tube 121 has its anode 122 coupled by a transformer 124 to its cathode 123. The windings of the transformer are so connected that an increasing anode current through the anode winding of the transformer induces a voltage in the cathode winding which tends to drive the cathode 123 negative. A positive source of potential energizes the anode 122 through a resistor 125 and is also applied to a voltage dividing network comprising a resistor 126 and an adjustable resistor 127 connected in series. A positive voltage is applied to the cathode 123 from the junction of resistors 126 and 127.

Control grid 128 of tube 121 is connected to the high potential side of a charge collecting capacitor 129 whose other side is grounded. Charge collecting capacitor 129 is adapted to receive charges either in response to pulse waves applied to lead 101 or lead 114. Leads 101 and 114 are connected through capacitors 131, 132 to shunt diodes 133 and 134 and series diodes 135 and 136, respectively. Shunt diodes have their anodes grounded and their cathodes connected to leads 101 and 114, respectively, while series diodes 135 and 136 have their anodes connected to leads 101 and 114, respectively, and their cathodes connected to grid 128.

In the operation of the structure shown in Fig. 5, the positive potential applied to cathode 123 by the voltage divider network 126, 127 maintains tube 121 below cutoff until the potential across charge collecting capacitor 129 reaches a predetermined positive critical value which triggers tube 121.

When capacitor 129 is raised to a sufficient potential to cause conduction in tube 121, anode current flows through transformer 124 and thereby induces a negative voltage in the cathode winding which is equivalent to driving the grid potential more positive. The anode current is thereby augmented, causing the tube 121 to reach current saturation rapidly. The grid 128 is driven sufficiently positive to draw current charging capacitor 129 negatively. At the instant saturation is reached, the anode current flowing through transformer 124 ceases to change and therefore induces no voltage in the cathode circuit. The driving voltage is thus momentarily removed and the effective cathode-to-grid voltage is lowered. The lowered cathode-to-grid potential causes less anode current flow. The decreased anode current induces a voltage in cathode winding 124 in an opposite sense, driving the cathode more positive which decreases the anode current still further until finally tube 121 is entirely nonconducting. The energy stored in the magnetic field and distributed capacitance of transformer 124 is then released producing a positive output pulse at the anode 122 which is supplied over lead 110 to frequency divider 103.

The shunt diodes 133 and 134 conduct all negative portions of the pulse waves applied over leads 101 and 114 to ground. The positive portions of these pulse waves are conducted through series diodes 135 and 136 to the capacitor 129 charging it positively. Until the grid to cathode voltage becomes positive enough to initiate the blocking oscillation, any positive charge accumulated on capacitor 129 must remain there because there is no path to ground. Thus each succeeding input pulse wave increases the potential across the capacitor 129 forming a step-shaped wave. When the grid to cathode voltage reaches the value at which anode current starts to flow in tube 121, the blocking oscillator cycle begins, and grid current flows which neutralizes the accumulated positive charge on capacitor 129. The capacitor 129 is momentarily given a negative charge by the flow of grid current, however, this charge is quickly dissipated by conduction through the diodes to ground. This action establishes a reference potential for the charge collecting capacitor 129 which is then ready for the next pulse waves from leads 101 and 114.

The resistance value of resistor 127 may be adjusted to vary the voltage on cathode 123. By this means the number of positive pulse waves required to build up sufficient charge on capacitor 129 to trigger the tube 121 may be altered, thus determining the frequency dividing ratio of the device.

Figure 7:
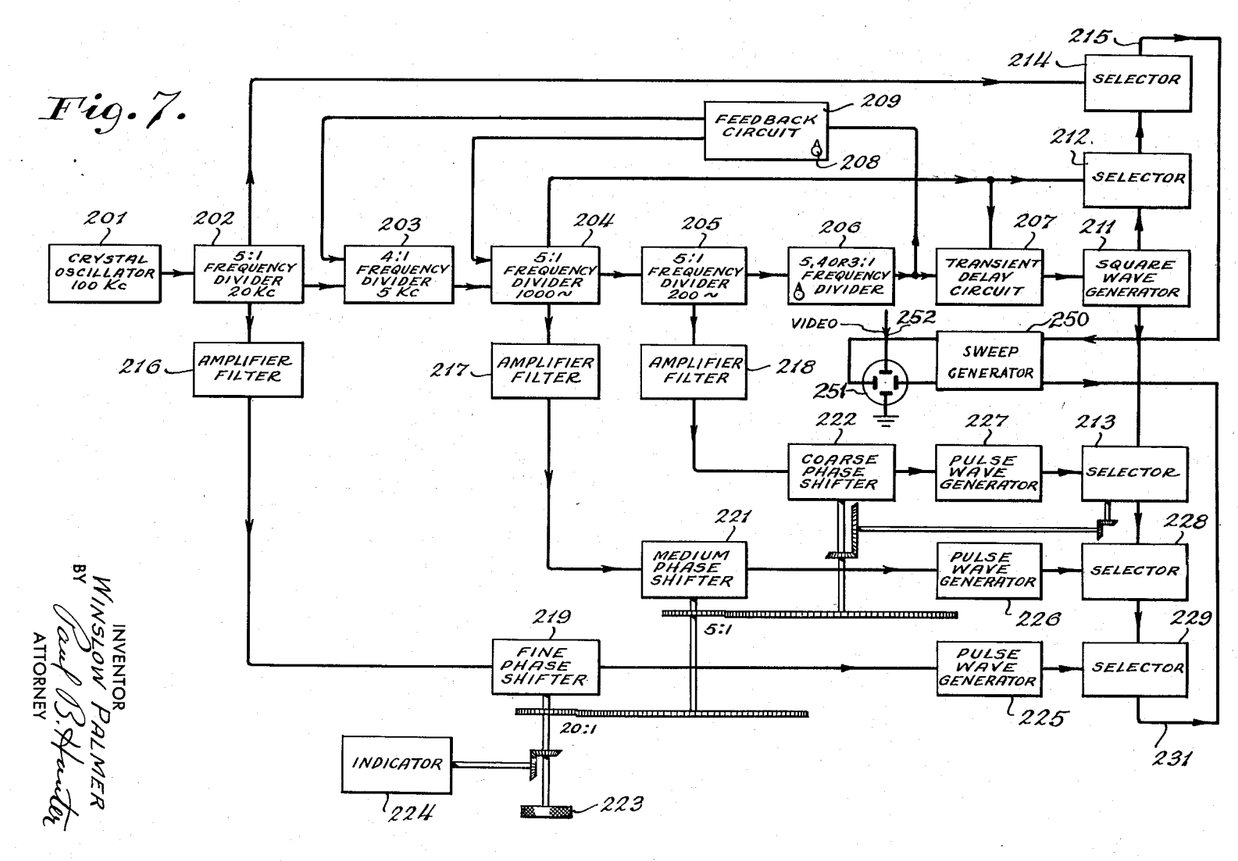
Fig. 7 is a block diagram of a particular timing apparatus incorporating the teachings of the present invention designed for use in a Loran receiver.

Fig. 7 illustrates timing apparatus, incorporating the teachings of the present invention, that is specifically adapted for use in a receiver of loran signals, the essential characteristics of which are described in the above-mentioned November 1945 issue of Electronics on pages 94–99.

A 100 kilocycle crystal controlled oscillator 201, which is the fundamental timing circuit of the equipment, provides constant frequency pulse waves to a chain of pulse wave counting frequency dividers 202, 203, 204 and 205, adjusted to reduce the applied frequency by factors of 5, 4, 5 and 5, respectively. The frequencies from intermediate points in the dividing chain are used as will be seen hereinafter for accurately controlling the reference pulse wave and the delayed pulse wave.

A further frequency divider 206 having an adjustable dividing factor of 5, 4 or 3 is employed after divider 205 to reduce the recurrence rate of the pulse wave to twice the frequency of the loran signals. Frequency divider 206 triggers a transient delay circuit 207 which produces a rectangular pulse wave of approximately 3000 microseconds duration. The transient delay circuit 207 delays all timing measurements until three pulse waves have been generated by frequency divider 204 after each pulse wave from the last frequency divider 206. This delay eliminates timing irregularity introduced by the frequency dividing circuits when the specific pulse wave switch 208 of a pulse wave feedback circuit 209 is not in the "off" position.

The termination of the transient delay rectangular wave triggers a square wave generator 211. The output of the square wave generator 211, the fundamental frequency of which is equal to the basic recurrence rate of the Loran signals, is fed in opposite phase to selector circuits 212 and 213, respectively. Selector circuit 212 is triggered on by the negative-going edge of the square wave. Selector 212 is "turned off" by the next pulse generated by frequency divider 204.

The rectangular output wave of selector 212 "turns on" a further selector circuit 214 which is "turned off" by the next succeeding pulse wave generated by frequency divider 202. The rectangular pulse wave appearing on output lead 215 of selector circuit 214 has the desired Loran signal recurrence rate and is timed with the precision inherent in the waves coming from frequency divider 202 and therefore may serve as the reference pulse wave.

To attain the required accuracy of measurement, three harmonically related frequencies 20 kilocycles, 1 kilocycle, and 200 cycles a second are derived from the frequency dividing chain by amplifier filters 216, 217 and 218 connected to output circuits of frequency dividers 202, 204 and 205, respectively.

Fine, medium and coarse continuously adjustable phase shifters 219, 221 and 222 are supplied with the substantially sinusoidal waves from filters 216, 217 and 218, respectively. These phase shifters are mechanically coupled together in accordance with the frequencies applied thereto. A delay control knob 223 is directly coupled to the fine phase shifter 219 and the position of this knob is indicated by a revolution counter 224 geared thereto. According to the prior art theory discussed in the introduction to the specification, the phase shifters 219, 221 and 222 are interconnected in such manner that a particular rotation of knob 223 produces progressively reduced rotation of the fine, medium and coarse phase shifters with the result that the harmonically related waves supplied thereto are subjected to substantially the same time delay. The phase shifted outputs of the circuits 219, 221 and 222 are applied to pulse wave generators 225, 226 and 227, respectively.

The first, second, third or fourth pulse wave from pulse wave generator 227 triggers "off" selector 213 after having been triggered "on" by the positive-going edge of the square wave from generator 211. The ordinal number of the pulse wave which "turns off" selector 213 is determined by a mechanical coupling to the phase shifter 222 in a manner similar to that described with reference to Fig. 3.

The selector 213 produces a rectangular wave varying in length from about 500 to 18,000 microseconds dependent upon the amount of rotation of delay control knob 223. The rear edge of this wave "turns on" a selector 228 which is "turned off" by the next succeeding pulse wave from pulse wave generator 226.

The selector 228 produces a rectangular wave that is approximately 650 microseconds long. The rear edge of this wave "turns on" a further selector 229 which is "turned off" by the next succeeding pulse wave from pulse wave generator 225. The length of the wave produced by selector 229 is approximately 30 microseconds long.

The wave generated by selector 229 and appearing on lead 231 has the desired loran signal recurrence rate and is delayed with the precision inherent in the phase-shifted waves from fine phase shifter 219 and therefore may serve as the delayed pulse wave.

The reference pulse waves from selector 214 and the delayed pulse waves from selector 229 are employed in a Loran receiver to trigger alternately a sweep circuit 250 of a cathode ray oscilloscope 251. Loran signals from lead 252 appearing on the screen of the oscilloscope may be superposed by manipulating delay control knob 223. The interval between loran signals is then equal to the interval between the reference and delayed pulse waves which may be read from indicator 224. Details of a cathode ray indicator of this type are published in the December 1945, Electronics Magazine.

Application S. N. 590,088 filed April 24, 1945, in the name of Eric J. Isbister, entitled "Interval Measuring System," now Patent 2,484,034, assigned to the same assignee as the present invention discloses part of but does not claim the subject matter of the present invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In electronic timing apparatus, means for producing a first series of waves having a substantially constant fundamental frequency, means for producing a second series of waves having a fundamental frequency related to the fundamental frequency of said first series of waves by an adjustable ratio, means responsive to the fundamental component of each wave of said first series for shifting the phase thereof, means for initiating reference and delayed pulse waves at said adjustable frequency and means for terminating said reference and delayed pulse waves in response to a particular wave of said first series and the phase-shifted component of a particular wave of said first series, respectively, subsequent to a predetermined portion of each wave of said second series, whereby said delayed pulse wave is delayed relative to said reference pulse wave by an interval unchanged by change in said adjustable frequency ratio.

2. In electronic timing apparatus, means for producing first frequency waves having a substantially constant fundamental frequency, means for producing a second series of waves having a fundamental frequency related to the fundamental frequency of said first frequency waves by an adjustable ratio, means responsive to the fundamental component of each wave of said first frequency for shifting the phase thereof, means for generating a pulse wave in response to the phase-shifted component of each first frequency wave, delay selector means for selecting a particular pulse wave subsequent to a predetermined portion of each wave of said second frequency, and means for generating a reference pulse wave in response to a particular wave of said first frequency subsequent to said predetermined portion of each wave of said second series, whereby said selected pulse wave is delayed relative to said reference pulse wave by an interval substantially unchanged by change in said adjustable frequency ratio.

3. In electronic timing apparatus, means for producing a first series of waves having a substantially constant fundamental frequency, means for producing a second series of waves having a fundamental frequency related to the fundamental frequency of said first series of waves by an adjustable ratio, means responsive to the fundamental component of each wave of said first series for shifting the phase thereof, means for initiating reference and delayed pulse waves in response to waves of said second series, means for terminating said reference pulse wave in response to a particular wave of said first series, and means for terminating said delayed pulse wave in response to the phase-shifted component of a particular wave of said first series, whereby the termination of said delayed pulse wave is delayed relative to the termination of said reference pulse wave by an interval unchanged by adjustment of said frequency ratio.

4. In electronic timing apparatus, means for producing a first series of waves having a substantially constant fundamental frequency, means for producing a second series of waves having a fundamental frequency related to the fundamental frequency of said first series of waves by an adjustable ratio, means responsive to the fundamental component of each wave of said first series for shifting the phase thereof, means for initiating at least two pulse waves in response to a predetermined portion of each wave of said second series, and means for terminating one of said pulse waves in response to the phase-shifted component of a particular wave of said first series, whereby the termination of said phase-shifted pulse wave is retarded relative to said predetermined portion of each wave of said second series by an interval unchanged by adjustment of said frequency ratio.

5. In electronic timing apparatus, means for generating a first series of pulse waves, means producing a wave in response to an adjustable number of pulse waves of said first series to form a second series of waves, means for generating a reference pulse wave at said second frequency, means to terminate said reference wave in response to a particular pulse wave of said first series subsequent to a predetermined portion of each wave of said second series, means for extracting from said pulse waves further waves having the fundamental frequency thereof, means for shifting the phase of said fundamental frequency waves, means for generating a delayed wave at said second frequency, means to terminate said delayed wave in response to a phase-shifted wave corresponding to a particular pulse wave of said first series subsequent to said predetermined portion of each wave of said second series, whereby said delayed pulse wave is retarded relative to said reference pulse wave by an interval insensitive to the numerical ratio between said first and second series of waves.

6. Apparatus for producing two periodic pulse waves of adjustable recurrence rate and predetermined time spacing, comprising means for generating recurrent groups of evenly spaced high frequency pulse waves, said groups being normally spaced according to the spacing of the individual pulse waves comprising the same, means for generating a low frequency pulse wave at the end of each group of high frequency pulse waves, feedback means for shortening the space between said groups to adjust the recurrence rate of said low frequency pulse waves, means for deriving a wave having the fundamental frequency of said high frequency pulses and synchronized in phase therewith, phase-shifting means for shifting the phase of said wave, means for generating a pulse wave in response to each cycle of said phase-shifted wave, means for generating a reference pulse wave in response to said low frequency waves and for terminating said reference wave in response to a particular high frequency pulse wave subsequent to said low frequency pulse wave, and means for initiating a delayed pulse wave in response to said low frequency waves and for terminating it in response to a particular one of said phase-shifted pulse waves subsequent to said reference pulse wave to obtain a delayed pulse wave, whereby the interval between said reference and delayed pulse wave terminations is unchanged by adjustment of the recurrence rate thereof.

7. Apparatus for producing two periodic pulse waves of adjustable recurrence rate and predetermined time spacing, comprising means for generating high frequency waves, means for generating a low frequency pulse wave at the end of each group of high frequency waves, means for adjusting the recurrence rate of said low frequency pulse waves, phase-shifting means for shifting the phase of said high frequency wave, means for generating a reference pulse wave in response to said low frequency waves and for terminating said reference wave in response to a particular high frequency pulse wave subsequent to said low frequency pulse wave, and means for initiating a delayed pulse wave in response to said low frequency waves and for terminating it in response to a particular phase-shifted wave subsequent to said reference pulse wave to obtain a delayed pulse wave, whereby the interval between the terminations of said reference and delayed pulse waves is unchanged by adjustment of the recurrence rate thereof.

8. Electronic timing apparatus comprising a source of constant frequency waves, a first counting means coupled to said source for generating a first pulse wave in response to a predetermined number of cycles of said constant frequency waves, a second counting means for generating a second pulse wave in response to a predetermined number of first pulse waves, feedback means for feeding back a portion of adjustable magnitude of each second pulse wave to said first counting means to contribute a wave thereto functionally equivalent to a desired number of cycles of said constant frequency waves, thereby shortening the period between said second pulse waves by a desired multiple of the period of said constant frequency waves, phase shifting means connected to said constant frequency source and adapted to phase shift said constant frequency waves, means responsive to said second counting means for initiating rectangular waves at said second pulse wave frequency, and means responsive to selected waves of said phase shifted waves to terminate said rectangular waves, whereby the duration of said rectangular waves is controlled by said constant frequency waves.

9. Electronic timing apparatus comprising a source of constant frequency waves, a first counting means coupled to said source for generating a first pulse wave in response to a predetermined number of cycles of said constant frequency waves, a second counting means for generating second pulse waves in response to a predetermined number of first pulse waves, feedback means for feeding back a porton of adjustable magnitude of each second pulse wave to said first counting means to contribute a wave thereto functionally equivalent to at least one cycle of said constant frequency waves and thereby shortening the interval between said second pulse waves by any desired multiple of the period of said constant frequency waves, phase-shifting means connected to said constant frequency source and adapted to phase shift said constant frequency waves, means responsive to said second counting means for initiating rectangular waves at said second pulse wave frequency and means responsive to selected waves of said phase shifted waves to terminate said rectangular waves, whereby the duration of said rectangular waves is controlled by said constant frequency waves.

10. Electronic timing apparatus comprising means for generating recurrent groups of evenly spaced first frequency pulse waves, said groups being normally spaced according to the spacing of the individual pulse waves comprising the same, means for generating a second frequency pulse wave at the end of each group of first frequency pulse waves, means for grouping said second frequency pulses, means for generating a third frequency pulse at the end of each group of second frequency pulses, feedback means for shortening the space between said groups to adjust the recurrence rate of said third frequency pulse waves, to any desired ratio to said first frequency, filtering means and phase shifting means connected to said first frequency generator and adapted to phase shift said first frequency waves, means responsive to said third frequency pulse generator to initiate rectangular waves at said third frequency and means responsive to selected waves of said phase shifted waves to terminate said rectangular waves, whereby the duration of said rectangular waves is controlled by said constant frequency waves.

11. Electronic timing means comprising a high frequency source, a chain of a plurality of adjustable frequency dividers connected in series to thereby provide a desired sub-multiple frequency and adjustable feedback means connected from a lower to a higher frequency point of said frequency divider chain and adapted to vary the output frequency about said sub-multiple frequency in steps controlled by said high frequency, phase-shifting means connected to said high frequency source and adapted to phase shift said high frequency waves, means responsive to the last frequency divider of said chain for initiating rectangular waves of said last frequency and means responsive to selected waves of said phase shifted waves to terminate said rectangular waves, whereby the duration of said rectangular waves is controlled by said constant frequency waves.

12. Electronic timing means comprising a source of high frequency, a first frequency divider connected to the output of said source, a second frequency divider connected to the output of said first frequency divider, and means to feedback from the output of said second frequency divider to the input of said first frequency divider signals of adjustable amplitude to thereby adjust the output frequency to a frequency which has any desired ratio to said high frequency, phase-shifting means connected to said high frequency source and adapted to phase shift the high frequency waves from said source, means responsive to said second frequency divider to initiate rectangular waves at said second frequency divider frequency and means responsive to said phase shifted high frequency waves to terminate said rectangular waves, whereby the duration of said rectangular waves is controlled by said constant frequency waves.

13. Electronic timing means comprising a frequency source, means to provide sub-multiple frequencies of said source frequency comprising a chain of adjustable frequency dividers, and means to provide a frequency intermediate to any of said sub-multiple frequencies comprising means to feed back an adjustable amplitude signal from a lower frequency point to a higher frequency point in said frequency divider chain, phase-shifting means connected to said frequency source and adapted to phase shift said frequency source output, means responsive to the output of the last frequency divider of said chain for initiating rectangular waves of said last frequency, and means responsive to said phase shifted output to terminate said rectangular waves whereby the duration of said rectangular waves is controlled by said constant frequency waves.

14. In electronic timing apparatus, means for generating a first series of waves of substantially constant frequency, means for dividing the frequency of said first series of waves by a desired factor to obtain a second series of waves, means for shifting the phase of said first waves, means for generating a pulse wave in response to each cycle of said phase shifted waves, means responsive to said frequency dividing means for initiating at least two rectangular waves of said second frequency, means responsive to selected waves of said phase shifted waves for terminating one of said rectangular waves whereby the duration of said second frequency waves is controlled to the order of accuracy of said first frequency waves.

15. Electronic timing apparatus, comprising means for generating a first series of waves of substantially constant frequency, means for dividing the frequency of said first series of waves by a desired factor to obtain a second series of waves, means for shifting the phase of said first waves, means responsive to said frequency dividing means for initiating a plurality of rectangular waves of said second frequency, means responsive to selected waves of said phase shifted waves for terminating said rectangular waves whereby the duration of said second frequency waves is controlled to the order of accuracy of said first frequency waves.

16. Electronic timing apparatus comprising, a source of constant frequency waves, a first counting means coupled to said source for generating a pulse wave in response to a predetermined number of cycles of said constant frequency waves, a second counting means for generating an output pulse wave in response to a predetermined number of pulse waves from said first counting means, adjustable amplitude feedback means for feeding back each output pulse wave to said first counting means to contribute a wave thereto functionally equivalent to at least one cycle of said constant frequency waves, thereby shortening the period between said output pulse waves by a desired multiple of the period of said constant frequency waves, delay means responsive to said second counting means for producing periodic waves free from transient distortion, means for filtering pulse waves from said first counting means to obtain substantially sinusoidal waves at a constant submultiple of said constant frequency waves, phase shifting means for adjusting the phase of said submultiple waves, means responsive to said periodic waves to initiate timing waves at said periodic frequency and also responsive to said phase shifted waves for terminating said timing waves.

17. The method of generating periodic signals of variable recurrence rate differing in time by an adjustable, continuously indicated interval comprising the steps of, generating stable frequency waves, dividing said frequency waves, initiating at least two periodic signals with said divided frequency waves, terminating one of said periodic signals with a phase shifted version of said stable frequency waves, and continuously measuring and indicating said phase shift, to thereby provide a continuous indication of the time interval between said periodic signals.

18. Electronic timing apparatus comprising, an oscillator, frequency divider means arranged to divide the frequency of said oscillator at least once, means responsive to said frequency divider output to initiate a pair of recurrent rectangular waves, means responsive to said oscillator to terminate one of said recurrent rectangular waves, phase-shifting means arranged to phase shift the output of said oscillator, and means responsive to said phase shifted output to terminate the other of said recurrent rectangular waves, whereby the delay between the terminations of said rectangular waves is proportional to said phase shift and is insensitive to the overall divisor of said frequency dividers.

19. Electronic timing apparatus comprising, an oscillator, frequency divider means arranged to divide the frequency of said oscillator at least once, feedback means connected between a lower frequency point and a higher frequency point of said frequency dividing means, means responsive to said frequency divider output to initiate a pair of recurrent rectangular waves, means responsive to said oscillator to terminate one of said recurrent rectangular waves, phase-shifting means arranged to phase shift the output of said oscillator, and means responsive to said phase shifted output to terminate the other of said recurrent rectangular waves, whereby the delay between the terminations of said rectangular waves is proportional to said phase shift and is insensitive to the overall divisor of said frequency dividers.

20. Electronic timing apparatus comprising, an oscillator, frequency divider means arranged to divide the frequency of said oscillator at least once, feedback means connected between a lower frequency point and a higher frequency point of said frequency dividing means, means responsive to said frequency divider output to initiate a pair of recurrent rectangular waves, means responsive to said oscillator to terminate one of said recurrent rectangular waves, phase-shifting means arranged to phase shift the output of said oscillator, and means responsive to said phase shifted output to terminate the other of said recurrent rectangular waves, and time indicating means responsive to said phase shifting means to indicate said delay.

21. Electronic timing apparatus, comprising an oscillator of stable frequency waves, adjustable frequency dividing means connected to the output of said oscillator, adjustable phase shifting means connected to the output of said oscillator, a first signal generator responsive to said frequency divider to be periodically turned on by said frequency divided waves and responsive to said oscillator to be turned off by a selected oscillator frequency wave, a second signal generator responsive to said frequency divider to be periodically turned on by said frequency divided waves in synchronism with said first signal generator and responsive to said phase shifting means to be turned off by a desired phase shifted oscillator frequency wave, and means to indicate the periodic time interval between the terminations of said first generator signals and said second generator signals including revolution counting means suitably connected to said phase shifting means.

22. Electronic timing apparatus comprising an oscillator of stable frequency waves, adjustable frequency dividing means connected to the output of said oscillator, adjustable phase shifting means connected to the output of said oscillator and arranged to shift the phase of said oscillator frequency waves, a pair of periodic signal generators responsive to said frequency divider to be turned on in synchronism, the first of said signal generators being responsive to said oscillator to be turned off by a selected oscillator frequency wave, and the second of said signal generators responsive to said phase shifting means to be turned off by a selected phase shifted wave at measurable time after said first signal generator is turned off, and indicating means responsive to said phase shifting means to indicate said measurable time.

23. Electronic timing apparatus comprising an oscillator of stable frequency waves, adjustable frequency dividing means connected to the output of said oscillator, adjustable phase-shifting means connected to the output of said oscillator and arranged to shift the phase of said oscillator frequency waves, a pair of periodic signal generators responsive to said frequency divider to be turned on in synchronism, the first of said signal generators being responsive to said oscillator to be turned off by a selected oscillator frequency wave, and the second of said signal generators responsive to said phase-shifting means to be turned off by a selected phase shifted wave at measurable time after said first signal generator is turned off, and indicating means responsive to said phase-shifting means to indicate said measurable time, said indicating means comprising a mechanical counter suitably geared to said phase shifter.

24. An oscillator, frequency divider generator means operably connected to said oscillator, a phase shifter connected to said oscillator and a pair of gate circuits both of which are adapted to be triggered "on" by said generator means and one of which is adapted to be variably terminted, by a signal from said phase shifter.

25. An oscillator, frequency divider generator means operably connected to said oscillator, adjustable delay means connected to said oscillator and a pair of multivibrators both of which are adapted to be triggered "on" by said generator means and one of which is adapted to be variably terminated by said delay means.

26. A method of measuring the delay between signals of adjustable repetition rate comprising, initiating gate pulses of adjustable repetition rate, terminating said gate pulses with signals of a higher frequency, delaying the termination of one of said gate pulses by phase shifting its higher frequency terminating signal, and determining the amount of said delay by measuring said phase shift.

27. A direct reading intervalometer for measuring time delays between pairs of received signal pulses of adjustable repetition rate, comprising means for locally initiating reference and delayed gate timing pulses of adjustable repetition rate, means for terminating said pulses by separate higher frequency timing pulses, means for delaying the termination of one of said adjustable repetition rate gate pulses by phase shifting its higher frequency terminating pulse, means for measuring said delay in terms of the wavelength of said higher frequency, including a direct reading time delay indicator connected to said phase shifting means for showing time delay.

28. In a radio system wherein periodically recurring A pulses and B pulses are received from pairs of ground stations and wherein a deflecting wave of fixed timing and a like deflecting wave of adjustable timing are to be produced for deflecting the cathode ray of a cathode ray tube indicator, said A pulses having the same repetition period as said B pulses, said repetition period being different for each pair of ground stations, means including an oscillator followed by a chain of frequency dividers for producing a square wave having the same repetition period as that of the A and B pulses received from a particular pair of ground stations, the half cycle of said square wave that occurs during the occurrence of a B pulse being identified as the slave period, means for obtaining from said last means a continuous sine wave signal having a fixed phase with respect to said slave period for any of said ground station repetition rates, a phase shifter through which said sine wave signal is passed to obtain a phase-shifted wave, means for converting said phase-shifted wave to short-duration timing pulses, means for selecting a desired one of said timing pulses, and means for producing said adjustable deflecting wave in response to the occurrence of said selected pulse whereby said adjustable deflecting wave may be shifted to a desired position along a time axis by selecting a desired timing pulse and by shifting the phase of the selected timing pulse by said phase shifter.

29. In a radio system wherein periodically recurring A pulses and B pulses are received from pairs of ground stations and wherein a deflecting wave of fixed timing and a like deflecting wave of adjustable timing are to be produced for deflecting the cathode ray of a cathode ray tube indicator, said A pulses having the same repetition period as said B pulses, said repetition period being different for each pair of ground stations, certain of said repetition periods being characterized in that a half cycle or half period is an odd multiple of a certain time period, means for producing a square wave having the same repetition period as that of the received A and B pulses from a particular pair of ground stations, the half cycle of said square wave that occurs during the occurrence of a B pulse being identified as the slave period, means for producing a continuous sine wave signal having a fixed phase with respect to said slave period and having a repetition period equal to said certain time period, a phase shifter through which said sine wave signal is passed to obtain a phase-shifted wave, means for converting said phase-shifted wave to short-duration timing pulses, means for selecting a desired one of said timing pulses, and means for producing said adjustable deflecting wave in response to the occurrence of said selected pulse whereby said adjustable deflecting wave may be shifted to a desired position along a time axis by selecting a desired timing pulse and by shifting the phase of the selected timing pulse by said phase shifter.

30. In a radio system wherein periodically recurring A pulses and B pulses are received from ground stations and wherein two similar deflecting waves, one of fixed timing and the other of adjustable timing, are to be produced for deflecting the cathode ray of a cathode ray tube indicator, said A pulses having the same repetition period as said B pulses, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for converting said phase-shifted wave to periodically recurring short-duration timing pulses, means for selecting a desired one of said timing pulses, and means for producing said adjustable deflecting wave in response to the occurrence of said selected pulse whereby said adjustable deflecting wave may be shifted to a desired position along a time axis by selecting a desired timing pulse and by shifting the phase of the selected timing pulse by said phase shifter.

31. In a radio navigation system wherein periodically recurring A pulses and B pulses are received from ground stations and wherein a variable index marker is to be produced, said A and B pulses having the same repetition period, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for converting said phase-shifted wave to periodically recurring short-duration timing pulses, means for selecting a desired one of said timing pulses, and means for causing said selected pulse to produce a variable index marker which may be shifted to a desired position by selecting a desired timing pulse and by shifting the phase of the selected timing pulse by said phase shifter.

32. In a radio navigation system wherein periodically recurring A pulses and B pulses are received from ground stations and wherein a fixed index marker and a variable index marker are to be produced, said A and B pulses having the same repetition period, means for producing a square wave having the same repetition period as said A and B pulses, the half cycle of said square wave that occurs during the occurrence of a B pulse being identified as the slave period, means for producing a sine wave signal having a fixed phase with respect to said slave period, a phase shifter through which said sine wave signal is passed to obtain a phase-shifted wave, means for limiting said phase-shifted wave for producing rectangular pulses, means for converting said rectangular pulses to short-duration timing pulses, means for selecting a desired one of said timing pulses, and means for causing said selected pulse to produce a variable index marker which may be shifted to a desired position by selecting a desired timing pulse and by shifting the phase of the selected timing pulse by said phase shifter.

33. Apparatus for determining the time interval between two time-spaced pulses, said apparatus including a pulse coincidence indicator, means comprising a chain of counters for producing an adjustably-delayed pulse, means for applying said delayed pulse to said coincidence indicator for bringing said two time-spaced pulses into coincidence, means comprising count-selecting means connected to said chain of counters for determining the amount of delay of said adjustably-delayed pulse, and means for indicating said time interval as a function of the adjustments of said count-selecting means.

34. A navigation system receiver for receiving two time-spaced pulses that are transmitted in a predetermined time relation from two geographically-spaced stations, respectively, said receiver including a pulse coincidence indicator, means comprising a chain of counters for producing an adjustably-delayed pulse, means for applying said delayed pulse to said coincidence indicator for bringing said two time-spaced pulses into coincidence, means comprising count-selecting means connected to said chain of counters for determining the amount of delay of said adjustably-delayed pulse, and means for indicating a time difference, corresponding to a navigation line of position, as a function of the adjustments of said count-selecting means when coincidence of said time-spaced pulse is obtained at said indicator.

35. A navigation system receiver for determining the time interval between two time-spaced pulses which recur at a certain repetition rate, said receiver including a cathode-ray tube having a screen on which said pulses are to appear and having means for causing said two pulses to appear on two traces on said screen whereby said pulses may be aligned, means for controlling the repetition rate of said traces and for adjustably controlling the time at which alternate traces start, said last means comprising a counter chain and repetition rate switching means and time delay switching means associated therewith for producing successive pulses of said certain repetition rate with alternate pulses having a selected delay, means for starting each alternate trace in response to the occurrence of each delayed pulse, whereby said selected delay may be made such as to align said two pulses on said screen and whereby the amount of delay required for said alignment may be read off said time delay switches.

36. In a system for determining the time interval between two time-spaced pulses which recur at a certain repetition rate, said system including a cathode-ray tube having a screen on which said pulses are to appear and having means for producing a cathode ray and directing it against said screen, a deflecting circuit for producing successive similar deflecting waves, means for deflecting said cathode ray successively by said deflecting waves and means for causing said time-spaced pulses to produce an indication on said screen during said deflections, means for controlling the repetition rate of said deflecting waves and for controlling the time at which alternate deflecting waves start whereby said time-spaced pulses may be aligned on said screen, said last means comprising a counter chain and repetition rate switching means and time delay switching means associated therewith for producing a pulse of said selected repetition rate and having a selected delay, said last pulse being applied to said deflecting circuit to produce a trace on the screen during one of said time-spaced pulses whereby said selected delay may be made such as to align said two pulses on said screen.

37. In a system for determining the time interval between two time-spaced pulses which recur at a certain repetition rate, said system including a cathode-ray tube having a screen on which said pulses are to appear and having means for producing a cathode ray and directing it against said screen, a deflecting circuit for producing successive similar deflecting waves, means for deflecting said cathode-ray successively by said deflecting waves and means for causing said time-spaced pulses to produce an indication on said screen during said deflections, means for controlling the repetition rate of said deflecting waves and for controlling the time at which alternate deflecting waves start whereby said time-spaced pulses may be aligned on said screen, said last means comprising a counter chain and repetition rate switching means and time delay switching means associated therewith for producing successive pulses of said selected repetition rate with alternate pulses having a selected delay, said successive pulses being applied to said deflecting circuit to produce traces on the screen during each of said time-spaced pulses whereby said selected delay may be made such as to align said two pulses on said screen.

38. Apparatus for determining the time interval between two time-spaced pulses, said apparatus including a pulse coincidence indicator for indicating visual coincidence of said two time-spaced pulses applied thereto, a chain of counters for producing an adjustably-delayed pulse, means comprising count-selecting means connected to said chain of counters for determining the amount of delay of said delayed pulse, a delay means, means for applying said delayed pulse to said delay means, means for obtaining from said delay means a pulse that is further delayed a selected amount by said delay means, means for applying said further delayed pulse to said coincidence indicator for bringing said two time-spaced pulses into visual coincidence, and means for indicating said time interval as a function of the adjustments of said count-selecting means and said delay means.

39. In a navigation system receiver for receiving two time-spaced pulses that are transmitted in a predetermined time relation from two geographically-spaced stations, respectively, said receiver including a pulse coincidence indicator for indicating coincidence of said two time-spaced pulses, a chain of counters for producing an adjustably-delayed pulse, means comprising count-selecting means connected to said chain of counters for determining the amount of delay of said delayed pulse, a delay means, means for applying said delayed pulse to said delay means, means for obtaining from said relay means a pulse that is further delayed a selected amount by said delay means, means for applying said further delayed pulse to said coincidence indicator for bringing said two time-spaced pulses into coincidence, and means for indicating a navigation line of position as a function of the adjustments of said count-selecting means and said relay means when coincidence of said time-spaced pulse is obtained at said indicator.

40. The invention according to claim 39 wherein there is means for supplying to the input end of said chain of counters a signal having a certain repetition period, and wherein said relay means provides increments of delay that are smaller than said certain repetition period.

41. In an electronic time measuring system, a source of first recurrent waves, frequency divider means coupled to the output of said source for producing an alternating output voltage whose frequency is less than the frequency of said first recurrent waves, phase shifting means coupled to the output of said source, said phase shifting means producing recurrent output waves phase shifted with respect to said first recurrent waves, first selector means coupled to the output of said frequency divider means and to the output of said source, said first selector means being responsive to said alternating output voltage and said first recurrent waves for producing a reference output timing wave whose recurrence frequency is equal to the frequency of said alternating output voltage, and second selector means coupled to the output of said frequency divider means and to the output of said phase shifting means, said second selector means being responsive to said alternating output voltage and said phase shifted recurrent output waves for producing a delayed output timing wave whose recurrence frequency is equal to the recurrence frequency of said reference output timing wave and whose time delay with respect to said reference timing wave varies according to the phase shift of said phase shifted recurrent output waves relative to said first recurrent waves.

42. The apparatus as defined in claim 41 wherein the delayed output timing wave produced by said second selector is delayed in time with respect to the reference output timing wave produced by said first selector by a fixed time interval equal to one-half cycle of said alternating output voltage plus a variable time delay interval varying according to the amount of phase shift between said phase shifted recurrent output waves and said first recurrent waves.

43. The apparatus as defined in claim 41 further comprising means coupled to said phase shifter means for indicating the amount of phase shift of said phase shifted waves.

44. In an electronic time measuring system, a source of first recurrent pulses of substantially constant frequency, frequency divider means coupled to the output of said source for producing an alternating output voltage whose frequency is less than the recurrence frequency of said first recurrent pulses, phase shifting means coupled to the output of said source, said phase shifting means producing second recurrent output pulses phase shifted with respect to said first recurrent pulses, first selector means coupled to the output of said frequency divider means and to the output of said source, said first selector means being recurrently activated during each first half cycle of said alternating voltage from said frequency divider means for recurrently selecting the first pulse from said source of first recurrent pulses to arrive at said first selector following each activation, said first selector means producing a reference output timing wave whose recurrence frequency equals the frequency of said alternating output voltage and whose time position is controlled by said selected first pulses, second selector means coupled to the output of said frequency divider means and to the output of said phase shifting means, said second selector means being recurrently activated during each second half cycle of said alternating voltage from said frequency divider means for recurrently selecting a particular pulse of said second recurrent pulses from said phase shifting means to arrive at said second selector following each activation, said second selector means producing a delayed output timing wave whose recurrence frequency equals the recurrence frequency of said reference output timing wave and whose time delay with respect to said reference timing wave varies according to the phase shift between said phase shifted second recurrent pulses and said first recurrent pulses.

45. The apparatus as defined in claim 44 further comprising means coupled to said frequency divider means for controlling the frequency division of said divider and the frequency of said alternating output voltage.

46. Electronic timing apparatus comprising in combination a source of first recurrent pulses, means coupled to the output of said source and responsive to said first recurrent pulses for producing a square-wave output voltage whose frequency is less than the frequency of said first recurrent pulses, electromechanical phase shifting means coupled to the output of said source, said phase shifting means producing second recurrent pulses shifted in phase relative to said first recurrent pulses, said phase shifting means including a shaft whose angular position determines the relative phase difference between said first and second recurrent pulses, first selector means coupled to the output of said square-wave producing means and to the output of said source, said first selector means being recurrently activated by the leading edges of said square-wave output voltage from said square-wave producing means for selecting a particular pulse of said first recurrent pulses to arrive at said first selector following each activation, said first selector means producing recurrent reference output timing pulses whose recurrence frequency equals the frequency of said square-wave voltage and whose phase is controlled by the particular selected pulses of said first recurrent pulses, second selector means coupled to the output of said square-wave producing means and to the output of said phase shifting means, said second selector means being recurrently activated by the trailing edges of said square-wave output voltage from said square-wave producing means for selecting a particular pulse of said second recurrent pulses to arrive at said second selector following each activation, said second selector means producing recurrent delayed output timing pulses whose recurrence frequency equals the frequency of said reference output timing pulses and whose time delay with respect to said reference output pulses varies according to the phase shift between said first and second recurrent pulses, and indicator means coupled to the shaft of said phase shifting means for indicating the time delay between said delayed output timing pulses and said reference output timing pulses.

47. The electronic timing apparatus as defined in claim 46 further comprising means coupled to said square-wave producing means for controlling the frequency of said square-wave voltage.

48. Electronic timing apparatus comprising in combination a source of first recurrent pulses, means coupled to the output of said source and responsive to said first recurrent pulses for producing a square-wave output voltage whose frequency is appreciably less than the frequency of said first recurrent pulses, electro-mechanical phase shifting means coupled to the output of said source, said phase shifting means producing second recurrent pulses shifted in phase relative to said first recurrent pulses, said phase shifting means including a shaft whose angular position denotes the relative phase difference between said first and second recurrent pulses, first selector means coupled to the output of said square-wave producing means and to the output of said source, said first selector means being recurrently initiated by the leading edges of said square-wave output voltage from said square-wave producing means, said first selector means being recurrently terminated by the first pulse of said first recurrent pulses to arrive at said first selector following each initiation, said first selector means producing recurrent reference output timing pulses whose recurrent frequency equals the frequency of said square-wave voltage and whose timing is controlled by the pulses of said first recurrent pulses that recurrently terminate said first selector means, second selector means coupled to the output of said square-wave producing means and to the output of said phase shifting means, said second selector means being recurrently initiated by the trailing edges of said square-wave output voltage from said square-wave producing means, said second selector means being recurrently terminated by a particular pulse of said second recurrent pulses to arrive at said second selector following each initiation, said second selector means producing delayed output timing pulses whose recurrent frequency equals the frequency of said reference output timing pulses and whose time delay with respect to said reference output timing pulses varies according to the phase shift between said first and second recurrent pulses, and indicator means coupled to the shaft of said phase shifting means for indicating the time delay between said delayed output timing pulses and said reference output timing pulses.

49. Electronic timing apparatus comprising in combination a source of first recurrent pulses, means coupled to the output of said source and responsive to said first recurrent pulses for producing a square-wave output voltage whose frequency is appreciably less than the frequency of said first recurrent pulses, electro-mechanical phase shifting means coupled to the output of said source, said phase shifting means producing second recurrent pulses shifted in phase relative to said first recurrent pulses, said phase shifting means including a shaft whose angular position denotes the relative phase difference between said first and second recurrent pulses, first selector means coupled to the output of said square-wave producing means and to the output of said source, said first selector means being recurrently initiated by the leading edges of said square-wave output voltage from said square-wave producing means, said first selector means being recurrently terminated by the first pulse of said first recurrent pulses to arrive at said first selector means following each initiation, said first selector means producing recurrent reference output timing pulses whose recurrent frequency equals the frequency of said square-wave voltage and whose timing is controlled by the pulses of said first recurrent pulses which recurrently terminate said first selector means, second selector means coupled to the output of said square-wave producing means and to the output of said phase shifting means, said second selector means being recurrently initiated by the trailing edges of said square-wave output voltage from said square-wave producing means, said second selector means being recurrently terminated by a particular pulse of said second recurrent pulses to arrive at said second selector means following each initiation, means for supplying a bias voltage to said second selector means, means including a control means coupled to said bias voltage supply means for varying the bias voltage applied to said second selector means, means coupling said control means to the shaft of said phase shifting means for increasing the bias voltage applied to said second selector means as the phase shift between said first and second recurrent pulses increases under the control of said phase shifting means, said second selector means being recurrently terminated by the same particular terminating pulse from said second recurrent pulses as the phase shift between said first and second recurrent pulses increases, said second selector means producing recurrent delayed output timing pulses whose recurrence frequency equals the frequency of said reference output timing pulses and whose time delay with respect to said reference output pulses varies according to the rotation of the shaft coupled to said phase shifting means, and indicator means coupled to the shaft of said phase shifting means for indicating the time delay between said delayed output timing pulses and said reference output timing pulses.

50. Electronic timing apparatus comprising in combination a source of first recurrent pulses of substantially constant frequency, frequency divider means coupled to the output of said source for producing output pulses whose recurrent frequency is appreciably less than the frequency of said first recurrent pulses, means coupled to said frequency divider means for controlling the recurrent frequency of said divided output pulses, a fixed time delay means coupled to the output of said frequency divider means, said fixed time delay means delaying said divided output pulse by a fixed time interval, means coupled to the output of said time delay means for producing an alternating output voltage from said delayed output pulses, phase shifting means coupled to said frequency divider means, said phase shifting means producing second recurrent output pulses whose recurrence frequency is different from said first recurrent pulses and the frequency of said alternating output voltage, first selector means coupled to the output of said alternating output voltage producing means and to the output of said frequency divider means, said first selector means being activated during each first half cycle of said alternating output voltage from said alternating voltage producing means for recurrently selecting the first pulse from said frequency divider means to arrive at said selector following each activation, said first selector means producing reference output timing pulses whose recurrence frequency equals the frequency of said alternating output voltage and whose time position is controlled by said selected first pulses from said frequency divider means, second selector means coupled to the output of said alternating voltage producing means and to the output of said phase shifting means, said second selector means being recurrently activated during each second half cycle of said alternating output voltage for recurrently selecting a particular pulse of the phase shifted recurrent pulses from said phase shifting means following each activation of said second selector, said second selector means producing delayed output timing pulses whose recurrence frequency equals the recurrence frequency of said reference output timing pulses and whose time delay with respect to said reference timing pulses varies according to the phase shift introduced by said phase shifting means, and indicator means coupled to said phase shifting means.

51. Electronic timing apparatus comprising in combination a source of first recurrent pulses of substantially constant frequency, first frequency divider means coupled to the output of said source, second frequency divider means coupled to the output of said first frequency divider means, pulse feedback means coupled from the output of said second frequency divider to the input of said first frequency divider for varying the frequency of the output pulses from said second frequency divider, time delay means coupled to the output of said second frequency divider means for delaying the recurrent output pulses from said second frequency divider means by a fixed time interval, means coupled to the output of said time delay means for producing an alternating output voltage whose frequency is appreciably less than the frequency of said first recurrent pulses, first phase shifting means coupled to the output of said first frequency divider, said first phase shifting means producing recurrent output pulses shifted in phase relative to the recurrent output pulses from said first frequency divider, said first phase shifting means including a shaft whose angular position controls the phase shift therethrough, second phase shifting means coupled to the output of said second frequency divider, said second phase shifting means producing recurrent output pulses shifted in phase relative to the recurrent output pulses from said second frequency divider, said second phase shifting means including a shaft whose angular position controls the phase shift therethrough, first circuit means coupled to the output of said means producing said alternating output voltage and to the output of said second frequency divider means, said first circuit means being responsive to said alternating voltage for recurrently selecting the first pulse to arrive at said first circuit means from said second frequency divider means during each first half cycle of said alternating voltage, second circuit means coupled to the output of said first circuit means and to the output of said first frequency divider means, said second circuit means being responsive to the selected pulses from said first circuit means occurring during the first half cycles of said alternating output voltage for further recurrently selecting the first pulse to arrive at said second circuit means from said first frequency divider, said second circuit means producing a reference output timing wave whose recurrence frequency equals the frequency of said alternating output voltage and whose time position is controlled by the selected first pulses from said first frequency divider, third circuit means coupled to the output of said alternating voltage producing means and to the output of said second phase shifting means, said third circuit means being responsive during each second half cycle of said alternating voltage from said alternating voltage producing means for recurrently selecting a particular pulse from said second phase shifting means, fourth circuit means coupled to the output of said third circuit means and to the output of said first phase shifting means, said fourth circuit means being responsive to the selected pulses from said third circuit means for further recurrently selecting a particular pulse from said second phase shifting means, said fourth circuit means producing a delayed output timing wave whose recurrence frequency is equal to the recurrence frequency of said reference output timing wave and whose time delay with respect to said reference timing wave varies according to the phase shift produced by said first and second phase shifters, and means coupled to said first and second phase shifters for indicating said time delay.

52. Electronic timing apparatus comprising in combination a source of first recurrent pulses, first frequency divider means coupled to the output of said source, second frequency divider means coupled to the output of said first frequency divider means, means coupled to the output of said second frequency divider means for producing an alternating output voltage, first phase shifting means coupled to the output of said first frequency divider means, said first phase shifting means producing recurrent output pulses shifted in phase relative to the recurrent output pulses from said first frequency divider, second phase shifting means coupled to the output of said second frequency divider, said second phase shifting means producing recurrent output pulses shifted in phase relative to the recurrent output pulses from said second frequency divider, first circuit means coupled to the output of said alternating output voltage producing means and to the output of said second frequency divider means, said first circuit means being responsive to said alternating voltage for recurrently selecting the first pulse to arrive at said first circuit means from said second frequency divider means during each first half cycle of said alternating voltage, second circuit means coupled to the output of said first circuit means and to the output of said first frequency divider means, said second circuit means being responsive to the selected pulses from said first circuit means occurring during the first half cycles of said alternating output voltage for further recurrently selecting the first pulse to arrive at said second circuit means from said first frequency divider means, said second circuit means producing a reference output timing wave whose recurrence frequency equals the frequency of said alternating output voltage and whose phase is determined by the selected pulses from said first frequency divider, third circuit means coupled to the output of said alternating voltage producing means and to the output of said second phase shifting means, said third circuit means being responsive during each second half cycle of said alternating voltage from said alternating voltage producing means for recurrently selecting a particular pulse from said second phase shifting means, fourth circuit means coupled to the output of said third circuit means and to the output of said first phase shifting means, said fourth circuit means being responsive to the selected output pulses from said third circuit means for further recurrently selecting a particular pulse from said second phase shifting means, said fourth circuit means producing a variably delayed output timing wave whose recurrence frequency is equal to the recurrence frequency of said reference timing wave and whose phase with respect to said reference timing wave varies according to the phase shift produced by said first and second phase shifters.

53. In a loran receiver, a direct reading time difference measuring system comprising in combination a source of first recurrent pulses of substantially constant frequency, means coupled to the output of said source for reducing the frequency of said first recurrent pulses, said means including a frequency divider means and a square-wave generator means, means coupled to said frequency divider means for controlling the frequency of the square-wave voltage from said square-wave generator means, the frequency of said square-wave voltage being equal to the pulse repetition frequency of received loran A and B pulses, means coupled to said frequency reducing means for producing a sinusoidal output voltage whose frequency is appreciably higher than the frequency of said square-wave output voltage and whose phase is fixed with respect to the phase of said square-wave voltage, phase shifting means coupled to said means for producing said sinusoidal voltage for producing a phase shifted sinusoidal output voltage, means coupled to the output of said phase shifting means for producing short recurrent pulses from said phase shifted sinusoidal voltage, responsive means coupled to said square-wave generator and to said short recurrent pulse producing means and responsive to said square-wave voltage during its second half cycles for selecting a desired one of said phase shifted short pulses once each half cycle of said square-wave voltage, said responsive means producing recurrent output timing pulses whose frequency is equal to the frequency of said square-wave output voltage and whose phase relative to said square-wave voltage varies according to the phase shift through said phase shifting means, and indicator means coupled to said phase shifting means for indicating the phase difference between said recurrent timing pulses and said square-wave voltage.

54. In a loran receiver, a direct reading time difference measuring system for producing variably delayed recurrent timing pulses comprising in combination a source of first recurrent pulses of substantially constant frequency, means coupled to the output of said source for reducing the frequency of said recurrent pulses, said frequency reducing means including a frequency divider and a square-wave generator, means coupled to said frequency divider means for controlling the frequency of the square-wave output voltage from said square-wave generator means, the frequency of said square-wave generator means being equal to the pulse repetition frequency of received loran A and B pulses, the first half cycle of said square-wave voltage corresponding to the time interval during which loran A pulses are received and the second half cycle of said square-wave voltage corresponding to the time interval during which loran B pulses are received, means coupled to said source of first recurrent pulses for producing a sinusoidal output voltage whose frequency is appreciably higher than the frequency of said square-wave voltage and whose phase is fixed with respect to the phase of said square-wave voltage, phase shifting means coupled to the output of said sinusoidal voltage producing means, said phase shifting means producing a phase shifted sinusoidal output voltage, means coupled to the output of said phase shifting means for producing short recurrent timing pulses from said phase shifted sinusoidal voltage, selector means coupled to said square-wave generator and said short recurrent pulse producing means and responsive to said square-wave voltage during its second half cycle for recurrently selecting a desired one of said short timing pulses from said pulse producing means, the frequency of said selected timing pulses being equal to the frequency of said square-wave voltage and the phase of said selected timing pulses relative to said square-wave voltage being controlled by said phase shifting means, and indicator means coupled to said phase shifting means for indicating the phase relationship between said selected timing pulses and said square-wave voltage.

55. In a loran receiver, a direct reading time difference measuring system, comprising a combination a source of first recurrent pulses of substantially constant frequency, means coupled to the output of said source for reducing the frequency of said first recurrent pulses, said means including a frequency divider means and a square-wave generator means, said square-wave generator means producing a low frequency square-wave output voltage, means coupled to said frequency divider means for controlling the frequency of said square-wave output voltage, the frequency of said square-wave voltage being equal to the pulse repetition frequency of received loran A and B pulses, phase shifting means coupled to the output of said source of first recurrent pulses, said phase shifting means producing second recurrent output pulses phase shifted with respect to said first recurrent pulses, means coupled to said frequency reducing means and responsive to said square-wave voltage during alternate half cycles for recurrently selecting a desired one of said phase shifted second pulses once each half cycle of said square-wave voltage, said means producing recurrent output timing pulses whose frequency is equal to the frequency of said square-wave output voltage and whose phase relative to said square-wave voltage varies according to the phase shift between said phase shifted second recurrent pulses and said first recurrent pulses, and indicator means coupled to said phase shifting means for indicating the phase difference between said recurrent timing pulses and said square-wave voltage.

References Cited in the file of this patent

UNITED STATES PATENTS

| | | |
|---|---|---|
| 2,403,527 | Hershberger | July 9, 1946 |
| 2,405,239 | Seeley | Aug. 6, 1946 |
| 2,410,156 | Flory | Oct. 29, 1946 |
| 2,420,516 | Bischoff | May 13, 1947 |